United States Patent [19]

De Nardis

[11] 3,922,187
[45] Nov. 25, 1975

[54] PNEUMATIC TIRE SHAPING APPARATUS
[75] Inventor: Floyd De Nardis, Harper Woods, Mich.
[73] Assignee: Uniroyal, Inc., New York, N.Y.
[22] Filed: Oct. 19, 1973
[21] Appl. No.: 408,130

[52] U.S. Cl.......... 156/415; 156/110 R; 156/123 R; 156/128 R; 156/394 R
[51] Int. Cl.²................... B29H 17/16; B29H 17/26
[58] Field of Search .......... 156/110, 123, 128, 394, 156/414–420

[56] References Cited
UNITED STATES PATENTS

| | | | |
|---|---|---|---|
| 1,474,149 | 11/1923 | Hopkinson et al. | 156/123 |
| 3,097,985 | 7/1963 | Heuze | 156/414 |
| 3,107,192 | 10/1963 | McNenney | 156/415 |
| 3,408,244 | 10/1968 | Frazier | 156/415 |
| 3,518,149 | 6/1970 | Mirtain | 156/416 |
| 3,580,782 | 5/1971 | Leblond | 156/415 |
| 3,595,724 | 7/1971 | Leblond | 156/415 |
| 3,676,262 | 7/1972 | Leblond | 156/417 |

FOREIGN PATENTS OR APPLICATIONS

| | | | |
|---|---|---|---|
| 432,412 | 1935 | United Kingdom | 156/394 |
| 929,777 | 1963 | United Kingdom | 156/128 |

*Primary Examiner*—Douglas J. Drummond
*Assistant Examiner*—John E. Kittle
*Attorney, Agent, or Firm*—Philip Sands, Esq.

[57] ABSTRACT

Apparatus for altering the shape of a first stage raw tire carcass from a substantially cylindrical form to a substantially toroidal form, preparatory to vulcanization. The apparatus includes a pair of coaxially spaced, disc-like, rigid-shouldered, support members upon which are mountable the bead regions of the carcass in fluid-sealing relation, and an assembly for displacing the support members coaxially toward one another to permit inflation of the fluid-sealed carcass into the form of a torus.

10 Claims, 2 Drawing Figures

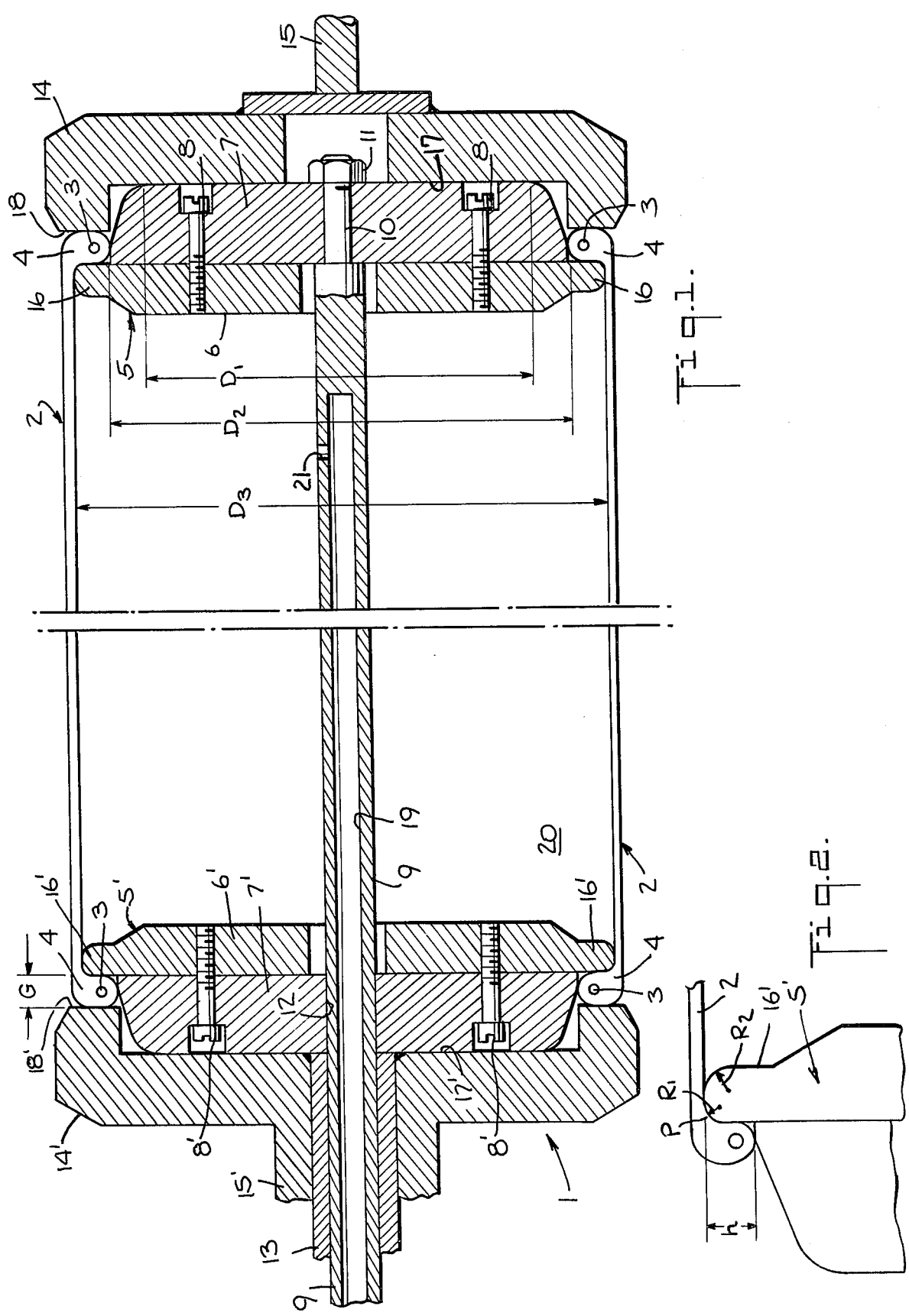

PNEUMATIC TIRE SHAPING APPARATUS

BACKGROUND OF THE INVENTION

The present invention relates generally to apparatus for shaping first stage raw tire carcasses, and more particularly to apparatus in which there is provided rigid means for sealing the bead regions of the carcass during inflation of the latter from a substantially cylindrical form to a substantially toroidal form.

Pneumatic tires are generally fabricated in two separate stages. A first stage of such fabrication includes the process of building a substantially cylindrical carcass of one or more superposed plies. The carcass terminates at its opposite ends in a pair of bead regions of reduced diameter in which there are confined, respectively, bead rings of inextensible metallic wire. Subsequently, the first stage carcass is placed upon a drum-like shaping mechanism which permits inflation of the first stage carcass and altering of the cylindrical form thereof into the form of a torus. Once in the form of a torus, one or more breaker plies and a tread are applied thereto to present a second stage carcass which is then vulcanized.

The present invention concerns itself primarily with the apparatus for altering the shape of the first stage carcass from its initial cylindrical form to a substantially toroidal form. More particularly, the present invention concerns itself with an improvement of the means for fluid-sealing the bead regions of the first stage carcass during the period in which the carcass is inflated.

Conventional shaping apparatus of such a nature generally comprises a pair of coaxially spaced, disc-like, support members which are interconnected by means of a fluid-sealed inflatable bladder. A first stage carcass is mounted upon the apparatus such that the cylindrically oriented plies overlie and surround the bladder, and the bead regions fit snugly upon the support members. The bladder, upon introduction of compressed air thereinto, assumes the shape of a torus as the support members are moved toward one another. The cylindrically oriented plies are, thus, forced to assume a corresponding toroidal form. Apparatus using bladders of this type is unnecessarily complex, costly and difficult to control during deflation of the bladder to permit removal of the carcass. Moreover, the bladder is not entirely reliable for establishing uniformity along newly formed "sidewall" portions of the toroidal carcass.

An improvement on such a first stage carcass shaping mechanism is disclosed in U.S. Pat. No. 3,518,149, issued June 30, 1970 to H. Mirtain. The improvement obviates the need for and omits the bladder from the assembly. The improvement utilizes resilient or elastomeric annular sealing gaskets which are carried by the disc-like support members and are engageable with and seal the bead regions of the first stage carcass during inflation of the latter.

However, it has been determined that such rubberized or elastomeric sealing gaskets require, to some degree, lubrication to permit sliding thereover and "chucking" or mounting of the bead regions upon the support members. The use of such lubrication eventually results in a softening and distortion of the rubber material of the gaskets. Such distortion, even if ever so slight, reduces, to some degree, the efficiency thereof for maintaining an air-tight seal during inflation of the first stage carcass.

SUMMARY OF THE INVENTION

Accordingly, it is an object of the present invention to provide an improved fluid-sealing means for such bead region support members which obviates the need of not only an inflatable bladder, but also the elastomeric sealing gaskets which are subject to distortion and are not entirely satisfactory for maintaining an effective air-tight seal during protracted and repeated use thereof.

To this end, the present invention relates to a first stage carcass shaping mechanism having a pair of coaxially spaced, disc-like, support members for mounting the bead regions of reduced diameter of a first stage carcass. The support members are each provided with a rigid, non-deforming, annular shoulder. The shoulders are engageable axially with, conform to the reduced diameter of and seal directly in air-tight relation the bead regions of the carcass.

BRIEF DESCRIPTION OF THE DRAWINGS

The above and additional objects and advantages of this invention will be more clearly understood from the following detailed description thereof when read in conjunction with accompanying drawings, in which:

FIG. 1 is a fragmentary, schematic, axially taken, partial cross-sectional view (not to scale) of apparatus pursuant to the present invention, a first stage carcass being illustrated thereon in cylindrical form; and FIG. 2 is a fragmentary, schematic view of the left one of the disc-like support members and its association with a bead region of the first stage carcass.

DETAILED DESCRIPTION OF THE INVENTION

Referring now to the drawings, and more particularly to FIG. 1, the present invention involves a shaping mechanism or apparatus 1 for altering the shape of a first stage raw tire carcass 2 from one of generally cylindrical form (FIG. 1) to one of substantially toroidal form (not shown). The raw carcass 2 includes one or more rubberized or elastomeric superposed plies which terminate in a pair of opposite ends of reduced diameter which are folded over upon themselves and confine therein, respectively, bead rings 3 of metallic wire. For purposes of reference herein the opposite ends of the carcass 2 are denoted generally by the reference character 4 and will be referred to hereinafter as bead regions.

The shaping mechanism 1 comprises a pair of coaxially spaced, disc-like, preferably metallic, support members 5 and 5', respectively. Each support member 5,5' includes a first rigid element 6,6' and a second rigid element 7,7' affixed to the first rigid element 6,6' such as by means of screws 8,8'. A cantilevered hollow shaft 9 supports each of the support members 5 and 5' in coaxial relation, the hollow shaft 9 being supported by conventional means (not shown) and terminating in a threaded end portion 10 of reduced diameter upon which is rigidly affixed the right-side rigid element 7 such as by means of a nut 11 or the like. On the other hand, the left-side support member 5' is slidably constrained upon the hollow shaft 9, the rigid element 7' of the support member 5' having an aperture 12 which conforms to and slidingly surrounds the shaft 9. The left-side support member 5' is axially shiftable relative to the right-side support member 5 by means of a second shaft 13 which surrounds and is slidable axially relative to the shaft 9. The shaft 13 is affixed to the element 7' such as by means of welding or the like.

A pair of bead pressure rings 14 and 14' are arranged concentrially relative to the shaft 9 and are spaced from one another through the intermediary of the spaced support members 5 and 5'. The bead pressure rings 14 and 14' are provided with shafts 15 and 15', respectively, which are adapted to effect movement of the rings toward one another such that they are engageable with the bead regions 4 of the carcass 2. The shaft 15' of the ring 14' is concentrically arranged upon and slidable axially relative to the shaft 13 which is associated with the left-side support member 5'. It will be understood, although not illustrated in the drawings, that the shafts 13, 15 and 15' are all independently axially shiftable relative to the stationary hollow shaft 9 such as by means of pneumatic or hydraulic power cylinders and like conventional means.

As illustrated in FIG. 1, the elements 7 and 7' are, in axial cross-section, provided with an outer periphery which is arcuately tapered from a minimum diameter $D_1$ remote from the elements 6 and 6' associated therewith, respectively, to a maximum diameter $D_2$ proximate their associated elements 6 and 6'. On the other hand, each of the elements 6 and 6' is provided with an outer periphery which has a diameter $D_3$ which corresponds substantially to the inner diameter of the cylindrical carcass 2. Accordingly, the maximum diameter $D_2$ of each of the elements 7 and 7' defines on each of the elements 6 and 6' a rigid, bead region-sealing, annular shoulder 16 and 16', respectively. The shoulders 16 and 16' have a radial extent denoted by the reference character $h$ (FIG. 2) which corresponds to the difference between the diameter of the cylindrical carcass 2 and the reduced diameter of each of the bead regions 4 of the carcass 2.

Preferably, as best illustrated in FIG. 2, each shoulder 16, 16', along one edge of its outer periphery, is provided with an axially directed first radius of curvature $R_1$ of approximately one-eighth inches which corresponds to the axially directed radius of curvature of an inner transition region P between each bead region 4 and the remainder of the carcass 2. Such complementing radii of curvature enhance the sealing capacity of the shoulders 16 and 16'. Moreover, each shoulder 16, 16', along the opposite edge of its outer periphery, is provided with an axially directed second radius of curvature $R_2$ of approximately one-fourth inches to facilitate forcible sliding thereover and mounting of the bead regions 4 on the elements 7 and 7', respectively.

As best illustrated in FIG. 1, each pressure ring 14, 14' is provided with a depressed portion 17, 17' and an annular end face 18, 18'. The depressed portions extend inwardly by an amount which is sufficient to permit the end faces 18 and 18' to press against and reduce the axially directed cross-sectional extent of each of the bead regions 4 by approximately one-sixteenth inches. In this respect, the depressed portions 17 and 17' are engageable axially with the elements 7 and 7', respectively, to define a gap G (FIG. 1) between each annular shoulder 16, 16' and its associated one of the end faces 18 and 18'. The gap G is approximately one-sixteenth inches less than the cross-sectional extent of the bead regions 4 to permit squeezing of the latter axially. Thus, the end faces 18 and 18' are adapted to squeeze the rubberized bead regions 4 against the annular shoulders 16 and 16', respectively, and enhance sealing of the carcass 2 when fluid is introduced thereinto via the bore 19 and aperture 21 in the shaft 9.

In operation, the raw tire carcass 2, in the form of a cylinder, is mounted upon each of the support members 5 and 5' by forcibly sliding the bead regions 4 over the annular shoulders 16 and 16'. The latter shoulders 16 and 16' exert oppositely directed axial forces against the bead regions 4 and, thereby, hold the latter upon the elements 7 and 7', respectively. Because of the relationship, size and configuration of the annular shoulders 16 and 16', relative to the conforming configuration of bead regions 4, the shoulders 16 and 16' are adapted to themselves fluid-sealingly rigidly grip and constrain the bead regions 4 upon each of the elements 7 and 7'. However, in order to enhance the degree of fluid-sealing, the pressure rings 14 and 14' are axially shifted into engagement with the bead regions 4 to, thereby, at least lightly squeeze the latter against the shoulders 16 and 16'.

Accordingly, when the carcass 2 is mounted upon the apparatus 1 illustrated in FIG. 1, and the pressure rings 14 and 14' are axially moved into engagement with the bead regions 4, a fluid such as air or the like is introduced through the shaft bore 19 into a chamber 20 defined by the fluid-sealed carcass 2, through the intermediary of the aperture 21 in the wall of the shaft 9. During air introduction into the carcass 2, the support member 5' and the pressure ring 14' are moved axially toward the support member 5 to thereby reduce the axial distance between the bead regions 4 and permit inflation of the carcass 2 into the form of a torus.

It will be understood that the annular shoulders 16 and 16' themselves, without any intermediary resilient gaskets, serve to seal the carcass 2 against fluid leakage. The bead regions 4 which are themselves elastomeric and deformable when squeezed also serve to seal any and all gaps between themselves and their associated ones of the annular shoulder 16 and 16'. Once inflated in the form of a torus, the carcass 2 is in a condition to be converted into a second stage carcass and then vulcanized.

It will be understood that the foregoing description of a preferred embodiment of the present invention is for purposes of illustration only, and that the various structural and operational features and relationships herein disclosed are susceptible to a number of modifications and changes, none of which entails any departure from the spirit and scope of the present invention as defined in the hereto appended claims.

What is claimed is:

1. Apparatus for altering the shape of a raw tire carcass from a substantially cylindrical form to a substantially toroidal form, preparatory to vulcanization, said carcass having at least one cylindrically oriented elastomeric ply which terminates at its opposite ends, respectively, in a pair of bead regions of reduced diameter, said apparatus comprising:
   a. a pair of coaxially spaced, disc-like, support members,
   each of said support members including a first rigid element having a non-gasket-carrying periphery of a diameter corresponding substantially to the diameter of said ply when in cylindrical form, and a second rigid element affixed to said first rigid element and having a non-gasket-carrying periphery of a diameter substantially corresponding to said reduced diameter or each of said bead regions, said support members being arranged such that each said first rigid element confronts the other in spaced relation, and each said second rigid element is spaced from the other through the intermediary of the spaced, confronting, first rigid elements, each of said first rigid elements co-operatively with its corresponding one of said second rigid elements defining an entirely rigid shoulder means for inflexibly directly contacting, with the absence therefrom of a resilient medium, and constraining, in fluid-sealing relation, a corresponding one of the carcass bead regions thereon; and b. means for displacing said support members coaxially toward one another to permit inflation of the fluid-sealed cylindrical ply into the form of a torus.

2. Apparatus as claimed in claim 1, including means operatively associated with each of said support members for pressing said bead regions axially against said first rigid elements, respectively.

3. Apparatus as claimed in claim 2, wherein the latter said means includes a pair of coaxially aligned pressure rings which are spaced from one another through the intermediary of the spaced support members, and means for displacing said pressure rings toward one another and into engagement with said bead regions, respectively.

4. Apparatus as claimed in claim 3, wherein said pressure rings each includes a recessed portion which is engageable with a corresponding one of said second rigid elements to delimit the extent of pressure which is exertable by said pressure rings against said bead regions, respectively.

5. Apparatus as claimed in claim 4, wherein said recessed portion of each of said pressure rings is axially depressed relative to that portion of said pressure rings which is engageable with said bead regions by an amount which is sufficient to reduce the axially directed cross-sectional extent of each of said bead regions by approximately one-sixteenth of an inch.

6. Apparatus as claimed in claim 1, wherein each of said second rigid elements in cross-section has an arcuately tapered bead region-engaging outer periphery which increases to a maximum diameter at said first rigid elements.

7. Apparatus as claimed in claim 6, wherein said maximum diameter defines an annular shoulder upon each of said first rigid elements having a radial extent of approximately the difference between the diameter of said ply in cylindrical form and said reduced diameter of said bead regions.

8. Apparatus as claimed in claim 1, wherein each of said first rigid elements in axial cross-section has a radius of curvature along one edge of its outer periphery most proximate its associated one of said second rigid elements which complements an inner axial cross-sectional radius of curvature of a transition between each of said bead regions and the remainder of said ply.

9. Apparatus as claimed in claim 8, wherein said radius of curvature of said first rigid elements is approximately one-eighth of an inch.

10. Apparatus as claimed in claim 8, wherein each of said first rigid elements in axial cross-section has an additional radius of curvature along an opposite edge of its outer periphery most remote from its associated one of said second rigid elements which is approximately one-quarter of an inch.

* * * * *